(12) United States Patent
Jones et al.

(10) Patent No.: US 7,376,619 B1
(45) Date of Patent: May 20, 2008

(54) METHOD AND SYSTEM FOR RAPID TENANT SCREENING, LEASE RECOMMENDATION, AND AUTOMATIC CONVERSION/TRANSCRIPTION OF DATA INTO LEASE DOCUMENTS

(75) Inventors: Scott A. Jones, San Jose, CA (US); Thomas E. Harrington, Los Altos, CA (US); Kevin W. Adams, Mountain View, CA (US); Jonathan T. Harrington, New York, NY (US)

(73) Assignee: On-Site Manager, Inc., Los Altos, CA (US)

( * ) Notice: Subject to any disclaimer, the term of this patent is extended or adjusted under 35 U.S.C. 154(b) by 1458 days.

(21) Appl. No.: 10/040,961

(22) Filed: Dec. 28, 2001

(51) Int. Cl.
*G06Q 40/00* (2006.01)
(52) U.S. Cl. .......................... 705/38; 705/35; 715/530
(58) Field of Classification Search .................. 705/38, 705/1, 39, 10, 35; 703/2; 706/11; 715/530
See application file for complete search history.

(56) References Cited

U.S. PATENT DOCUMENTS

| | | | | |
|---|---|---|---|---|
| 5,774,883 | A * | 6/1998 | Andersen et al. | 705/38 |
| 5,844,817 | A * | 12/1998 | Lobley et al. | 703/2 |
| 6,088,686 | A * | 7/2000 | Walker et al. | 705/38 |
| 6,272,467 | B1 * | 8/2001 | Durand et al. | 705/1 |
| 7,047,491 | B2 * | 5/2006 | Schubert et al. | 715/530 |
| 2001/0034700 | A1 * | 10/2001 | Foss et al. | 705/38 |
| 2002/0023051 | A1 * | 2/2002 | Kunzle et al. | 705/38 |
| 2002/0069230 | A1 * | 6/2002 | Schubert et al. | 707/530 |
| 2004/0030640 | A1 * | 2/2004 | Mahnken et al. | 705/39 |
| 2004/0138997 | A1 * | 7/2004 | DeFrancesco et al. | 705/38 |

OTHER PUBLICATIONS

SafeRent Upgrades Applicant Screening Service With New Features And Simplified Interface; Renovation Includes New Branding and Look/Feel, Mar. 1, 2001, p. 1-2.*
Gehrlein, William and Wagner, Bret. A two-stage least cost credit scoring model. Annals of Operations Research 74(1997) p. 159-171.*
Uhland, Vicky. SafeRent Take Guess out of Rental Approval. Rocky Mountain News. Mar. 11, 2001, p. 1-3.*
SafeRent Secures $4.25 Million in Convertible Debt Financing; Investment Funds Total $12 Million for 2000. Dec. 15, 2000. p. 1-2.*

* cited by examiner

*Primary Examiner*—James P. Trammell
*Assistant Examiner*—Jamie Swartz
(74) *Attorney, Agent, or Firm*—Dorsey & Whitney LLP

(57) ABSTRACT

System, method, computer program and computer program product, and business model for rapid tenant screening, recommendation, and conversion of data to lease documents. Provides structure and method for entering data from application to rent real estate for rapidly acquiring credit and screening from servers for the prospective tenant, passing information through a computer program that evaluates financial criteria, and presenting decision whether or not to accept tenant. Manager enters information about property and terms of lease, and automatically converts tenant credit information into leasing for signatures that will serve as legal basis for tenancy. Lease and credit information are all stored on central computer, remotely accessible for both on-site and off-site management to view, and controlled by access security protocol. Tenant rent and lease information is automatically entered into tenant files, viewable remotely, so that there is a real-time view of tenant status for those with permission to access information.

28 Claims, 4 Drawing Sheets

METHOD AND SYSTEM FOR RAPID TENANT SCREENING, LEASE RECOMMENDATION, AND AUTOMATIC CONVERSION/TRANSCRIPTION OF DATA INTO LEASE DOCUMENTS

FIELD OF INVENTION

This invention pertains generally to system and methods for acquiring and manipulating data and other information and for processing such information to generate new documents based on the acquired data and information, and more particularly to a system and method for rapid tenant screening, lease recommendation, and conversion of data to lease documents.

BACKGROUND OF THE INVENTION

The real estate management industry consists of properties with rental tenants that are managed by either the owner or his/her agent, who is located at a different site.

Today's typical rental process consists of the on-site manager taking a credit application written by hand by a prospective tenant, and submitting the application by verbal telephone conversation, by fax, or by a modem to a credit checking agency. The credit agency will then check their data base for information that they have on the applicant and respond within a period of anywhere from one minute to as much as several days, generally by fax or modem, with a credit report on the prospect. If the on-site manager has the authority, they will make a decision based on the credit report results, often after making some auxiliary phone checks on information, whether or not to rent the space to the applicant. Some large organizations assign the credit checking to an off-site person who will communicate by fax or phone. In either case, the decision whether or not to rent to a prospective tenant is somewhat subjective to the extent that it is difficult to evaluate someone's future ability to pay based on their past history. The process is open to charges of discrimination.

The on-site manager will then hand-write leases and other documents necessary for the tenant to move in.

This rental process takes place over a period of up to several days because of the various separate procedures that a rental manager must go through to gain information about the prospective tenant. This time is expensive for the manager and for the property owner who could be getting rent for his space during the period of time consumed by the delay.

Therefore there remains a need to remove some of the subjectivity and improve the objectivity and efficiency of the rental and leasing processes. There also remains a need for system, method, and procedures that integrates and improves upon existing conventional procedures and to save time and money for all the parties.

SUMMARY

Figure 1:
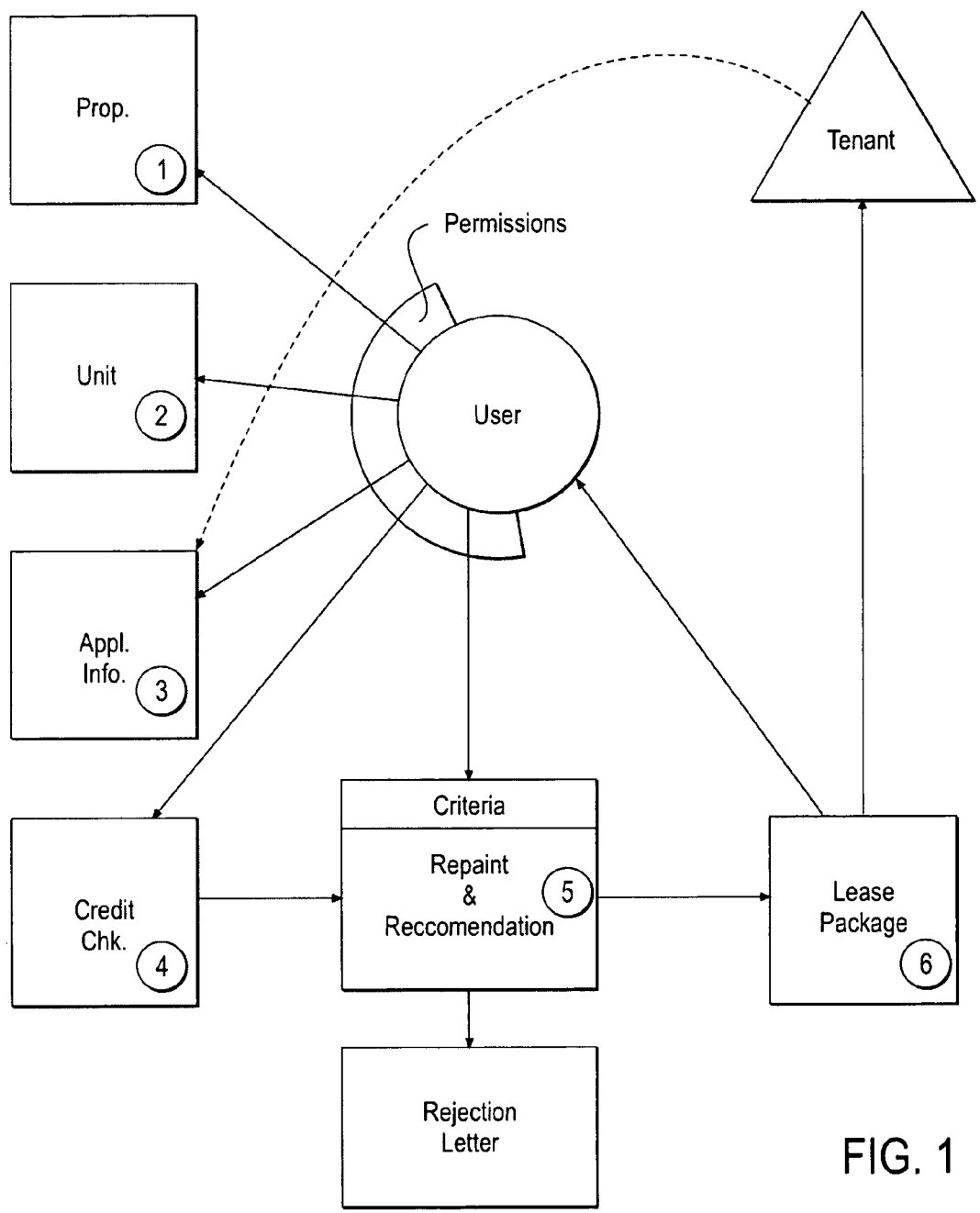
FIG. 1 is a diagrammatic illustration showing a six-step embodiment of a process for renting real estate.

This invention provides system, method, business model, and computer program and computer program product for entering data from an application to rent real estate, either from a written application or via an internet form, into this system for rapidly acquiring credit information and other screening information from local or remote servers for the prospective tenant, passing the information through a computer program that evaluates certain predetermined financial criteria, and presenting a decision to the manager whether or not to accept the tenant. The manager enters certain information about the property and terms of the lease, and automatically converts the tenant credit information into leasing documents and other disclosures, rules, and other information for signatures that will serve as the legal basis for the tenancy. The lease and credit information are all stored on a central computer, remotely accessible for both on-site and off-site management to view, and controlled by a security protocol that provides both storage for the documents and security of access. The tenant rent and lease information is automatically entered into tenant files, viewable remotely, so that there is a real-time view of the tenant status for those with permission to access the information.

DETAILED DESCRIPTION OF EMBODIMENTS

The inventive system, method, computer program and computer program product, and business model includes numerous aspects that improve over the prior-art. In one aspect, the invention provides means for connecting the on-site and off-site personnel to appropriate credit reporting agencies, presents the data available from those agencies in a format that rearranges or translates the information into a readable scheme, avails the assigned manager the ability to add to that data by calling employers or existing landlords, then makes an accept-or-reject recommendation based on the total data available as it compares to acceptance criteria that has been predefined by the property owner or his agent. Then, the same data (or a processed version of the data) that was gathered from credit and other sources are automatically and efficiently converted to lease documents and other necessary documents to complete a move-in. The invention automatically supplies the proper lease for the city and state where the property is located.

The inventive method and system for rapid tenant screening, recommendation, and conversion of data to lease documents speeds up the process of renting real property to qualified tenants. It integrates and improves upon several separate processes that are used in today's rental environment into a fast and efficient process that among its advantages, saves time and money and results in a much faster system of renting real estate.

While embodiments of the invention are described in the context of a residential real estate rental or lease situation, and identifiers associated with a residential property and residential tenant are described in detail, it will be appreciated by those workers having ordinary skill in the art in light of the description provided here, that the rental or lease may alternatively involve a commercial real estate transaction with identifiers associated to commercial real estate and commercial tenants. Furthermore, the inventive system may be extended to other retail and/or commercial transactions.

In one embodiment of the invention is illustrated in FIG. 1. It shows a six-step process for renting real estate that can result in renting a unit in less than five minutes, rather than several days.

The user is guided through the six-step process by a navigation map and indicator that is located at the top of each page. This guide shows the user where they are among the six steps and offers them an opportunity to click on any of the icon-steps and go to that page.

Choosing the Property is the first step in the process. In this step, we check to see if the parameters for the property have been entered before for this user. If so, the user can move to the next step. If not, the property must be "set-up"; that is, data is entered such as the name of the property, the number and street address, whether each unit has its own address or is a unit # of a master street number, the city and state and zip code for the property. Then, policies for this property are defined: when the rent is due, when it is late, the late payment fee, the pet policy, whether waterbeds are allowed, if there is a pool, policies on garages, mailboxes, storage, furniture, antennas, and any other specific policies to that property address. The address where rent is paid must also be entered and to whom the check is made payable to. Finally, the user enters criteria that will be used by the tenant screening recommendation engine for this property. This information is then stored on the main computer server as associated with this user, and will not need to be entered again. When the user comes to use the site again, when identified by their user #, their property will show as owned by them and they will not need to enter the information again. They may then skip to step two.

Choosing the unit number is the second step. In this step the user checks to see if the unit number for the property selected in step 1, if there is one, has previously been entered by the user. If it has, the user selects the unit as the one being rented in this case and skips to the next step. If it has not, the unit must be "set-up". The unit number is entered, and the number of bedrooms and baths is also entered. This defines the unit, and the user skips to the next step.

Entering the applicant information is the third step. When beginning this step, the system will show any prospective applicants that have previously been entered for the chosen unit. If the present applicant will be joining the other applicant, an option for this is selected. If the previous applicant is being rejected, that option is selected. If the present applicant will replace the existing tenant, that option is selected. In addition, if any residents are on record for that unit already, then the system will offer to include any of the existing residents in the new application.

The typical user will already have a filled out paper application form from the applicant. The user then enters the information into the system. This information will include one, more, or all of the following: Full legal name, including first name, middle initial, and last name, social security number, previous address, spouse's full name, dependents, employer name and address, and name of all dependents. The system can save multiple roommates and then continue. In some cases the applicant will fill out an application via an Internet connection, and the information will be transferred into step 3 above. In other cases, application information will be transferred from other web sites that are advertising rental space, and the applicant information will be transferred into step 3 above.

The user is then prompted to enter the terms for renting the unit that is under consideration. These terms include one or more of the following: Lease length, start date, end date, rent amount, deposit, and move-in date. The user is then prompted for confirmation of the information on the applicant. If it is OK, then the user continues. If it is not, the user may go back and correct any incorrect information.

The user is then prompted to check a box that indicates that he has written permission to run a credit check on the applicant. If there is more than one applicant for the same unit (such as a roommate or other non-spouse adult), the user is then asked which applicant to run a credit check on. The system will not run a credit check unless the box indicating written permission is checked for each applicant. Upon selecting which applicant to run a credit check on, the user moves to step 4.

The credit check is step 4. When the user gives the command, the system sends a query to a remote server at one of the credit bureaus to ask for the credit report for the applicant. The system returns the information within one or two seconds, and the system parses the raw credit information into a format that is readable by a user who is not necessarily trained to interpret the difficult format of a typical "raw" credit report. This method and system removes credit card account numbers and other account numbers that are not a true factor in determining the ability of someone to pay rent. The parsing lists all the accounts, and positive and negative ratings by the creditors, amounts outstanding, estimates of payments, and a social security scan to see if the number given was a valid number. If there is another credit check to run on the same unit, then it can be run next.

The Recommendation and Report is step 5. In one embodiment, this system and method utilize a procedure (here in the form of a formula) that has six factors that are considered, depending upon their relative importance as determined by the user, and result in a recommendation to the manager whether or not to rent to the applicant. Other embodiments may use selected ones of these factors and ignore others, or add additional factors to one or more selected from the set. These factors will be discussed below. The system prints out the parsed credit information along with its recommendation whether or not to rent to the prospective tenant. The recommendation is displayed as a thumb up, indicating the system recommends renting to the applicant; a thumb down, indicating that the system recommends that the applicant be rejected; or a thumb sideways, which indicates that the applicant is marginally qualified for the proposed unit and that additional security deposit or last month's rent should be collected. If there are several roommates in the application, the system changes the criteria such that each applicant must be able to handle their share of the rent plus at least 10% (or some other predetermined share) over his prorata share of the rent. Alternative rent sharing criteria other than a prorata plus percentage formula may be applied. After viewing each credit report, the system offers an application overview and an overall recommendation, along with options to approve or reject the application. In one embodiment, the overall recommendation may involve a combination of each roommate's score. If the user chooses to approve the application, he/she will be prompted to generate the lease documents and if they choose to reject the application, the system will print a rejection letter describing to the applicant where they should direct questions about their credit data. The system also allows the user to put the application into a "pending" category that allows them to decide later.

Step 6 is Generation of the Lease documents. If the user decides to proceed to generate the lease documentation after step 5 above, they simply press the button and all the lease documents are printed and ready for signature. The lease documents may conform to local or regional practice, but would usually consist of the following or their equivalent (i) Lease, indicating rent, deposit, start date, and length of lease, any concessions.
(ii) Any disclosures about the property such as asbestos, lead paint, radon gas, mold, crimes committed on the property, or other disclosures (optional or where required by law).
(iii) Rules about use of common areas (optional).
(iv) A move-in condition check list (optional).
(v) Other agreements detailing policies on pets, waterbeds, or security deposits (if any).
(vi) Rent control or other ordinances pertaining to the property (if any)

These lease documents are generated using the data that was entered from previous steps, including applicant information and property information. It does not require re-entering of any of the same information. The system will also remember both the tenant and property information for next time the user enters the system with the same account number.

The lease document will be generated in either HTML or PDF form, depending on the selection made by the user (the system is capable of generating documents in other formats as well) and printed on paper, though electronic form may optionally be used along with electronic signature. The lease is now ready for signature.

Signing of the lease document typically takes place at the on-site manager's office, at an off-site office of the owner's agent, or anywhere else that the owner or his agent may meet the tenant. If the lease and move-in documents are signed at an office that uses a digitally scanned signature attachment to the computer, the system will store the signature along with the lease and move-in documents.

It is a particularly advantageous feature of this system and method of rapid tenant screening, recommendation, and conversion of data to lease documents that the system and method allow a property owner or his agent to control certain levels of "permissions" for different employees. While a small owner may wish to do all of leasing himself, a larger owner, with many properties and many employees, will most likely prefer to have lower level employees not have access to certain areas of this program's capabilities. For example, a large owner may not want to have an on-site apartment manager have the ability to change terms of a lease or approve applications. He may want only a higher-level employee to approve applications.

The "permissions" section of this invention has default settings that allow a user to have access to all portions of the system. However, if a particular class of owner (such as a large owner) wishes, he/she may designate himself/herself as the only user to be able to "edit company permission", a setting that allows him to control what other users of the system in his company will be able to do. The system allows certain permissions to be locked out to lower level employees, with "on/off" flags for each system function. In addition, some of the permissions allow for different levels of access. For example, a certain user could be restricted to only be able to approve those applications that the system recommends, while other users could have no ability to approve applications, or the ability to approve any application.

Step 5 above referred to certain recommendation factors that the user can set to "tighten" or "loosen" in order that the system would recommend that a tenant be acceptable. This is certainly one of the "permissions" that an owner may not wish to have lower level employees control because it could lead to poor tenants and degradation of his property. The system is designed so that six criteria may be rated by the user on a five-step scale from "extremely important" to "not very important" Additional criteria may be added into the decision engine to refine the decision-making. The six criteria provided for in one embodiment are: ratio of monthly gross income to rent, minimum monthly gross income less rent and estimated debt payments, maximum percentage of credit accounts with late payments, maximum amount of unpaid collections, bankruptcy history, and previous tenant history. The user sets each of the minimum criteria for these items (for example, the minimum income to rent ratio might be set to 2.5). One, a subset of these six criteria, or a subset of the criteria plus additional criteria may alternatively be used.

These ratings by the system user, combined with the data collected from the credit report, the application data, and the property data, are used to create a score for the applicant, ranging for example from "0" to "10". In one embodiment, the system recommends anyone scoring over "7". A score between "5" and "7" generates a recommendation that further financial security is needed. A score under "5" results in a rejection recommendation. Other or alternative scoring values or scoring criteria may alternatively be adopted.

In one embodiment, the score is compiled as follows. Each of the criteria is given a score between 0 and 10. A score of 7 is awarded for the "minimum requirement" for each criteria, and if the applicant exceeds the requirement for a particular criteria, they receive a score above 7 and if they fail to meet the minimum requirement, then they are given a score below 7. The system uses three formulae to calculate scores for continuous requirements (red flag requirements, such as the bankruptcy, are a simple step or binary function).

Those criteria where a higher applicant value indicates a more desirable tenant typically use the following formula 1 to calculate the score (y), given by the expression:

$$y = \left\{k1 + \frac{k2}{[1+b(x-c)^2]}\right\}\left[1 - \frac{k3}{1+e^{a(x-c)}}\right], \quad (1A)$$

where the value calculated for the applicant is x, the minimum requirement set is c, and the constants a and b are selected to scale the results appropriately for the type of criteria. In one embodiment, k1=10, k2=4, and k3=1 to scale the resulting score to a value between 0 and 10, and yield the expression:

$$y = \left\{10 + \frac{4}{[1+b(x-c)^2]}\right\}\left[1 - \frac{1}{1+e^{a(x-c)}}\right]. \quad (1B)$$

Figure 2:
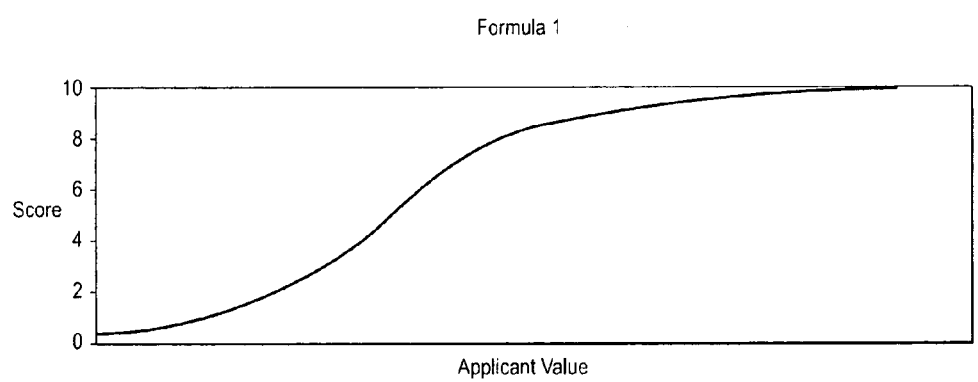
FIG. 2 is a diagrammatic illustration showing a first computational formula and its corresponding graphical characteristic.

A characteristic of this expression is illustrated in FIG. 2.

Those criteria where a lower applicant value indicates a more desirable tenant use one of the two the following formulas to calculate the score. Formula 2 given by the expression:

$$y = \left\{k1 + \frac{k2}{[1+b(x-c)^2]}\right\}\left[\frac{k3}{1+e^{a(x-c)}}\right], \quad (2A)$$

is typically used when the scale of the value will never exceed a certain amount (for example, when a criteria is a percentage, which will always be between 0 and 100%). In this expression, k1, k2, and k3 are constants. These constants control the scale of the resulting score. For example, in one embodiment (see below) the constants are chosen so that the score is between 0 and 10. The constants a and b are constants chosen to scale the resulting score appropriately for the type of criteria. The constant c in this expression is the maximum set by the user for this criteria. In one particular embodiment, k1=10, k2=4, and k3=1 yielding the expression:

$$y = \left\{10 + \frac{4}{[1+b(x-c)^2]}\right\}\left[\frac{1}{1+e^{a(x-c)}}\right]. \quad (2B)$$

Figure 3:
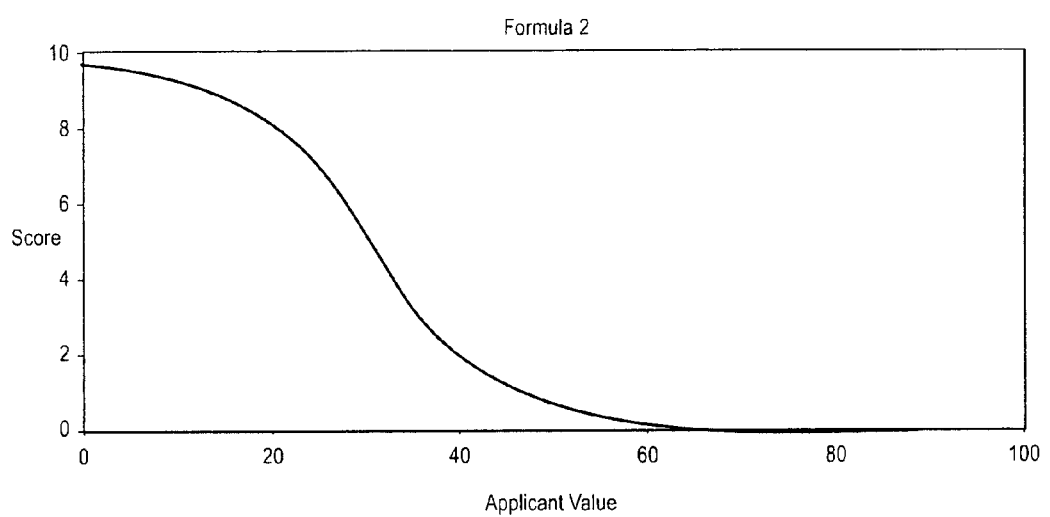
FIG. 3 is a diagrammatic illustration showing a second computational formula and its corresponding graphical characteristic.

A characteristic of this expression is illustrated in FIG. 3.

Alternately, an exponential decay formula can be used, of the form:

$$y = k5 \times e^{kx/c} \quad (3A)$$

where the value calculated for the applicant is x, the minimum requirement set is c, and k is a constant. In one embodiment, k=0.7 and k=10 which establish the curve and expression so that the maximum value is 10 and the value when x=c is 7, and the expression is given as:

$$y = 10 e^{0.7x/c} \quad (3B)$$

Figure 4:
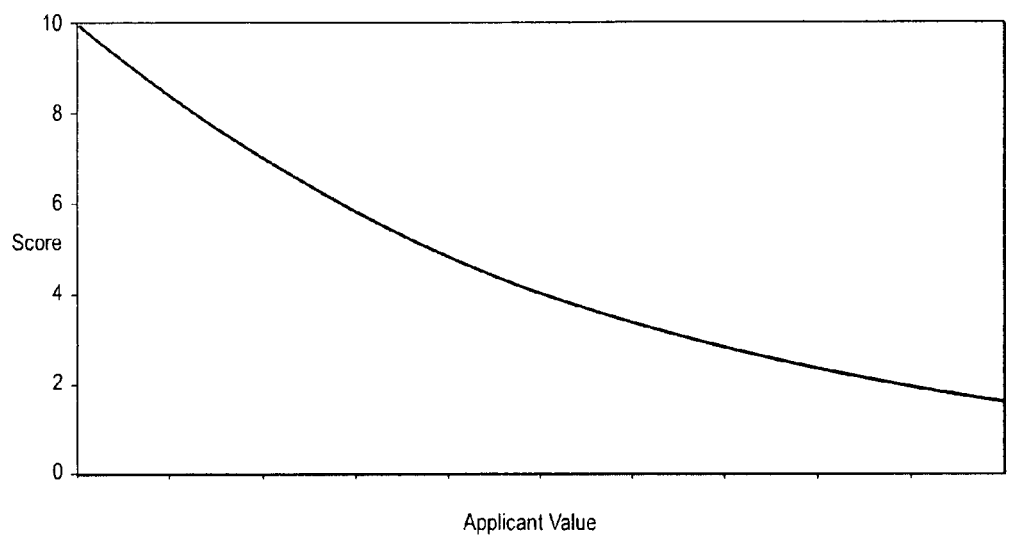
FIG. 4 is a diagrammatic illustration showing a third computational formula and its corresponding graphical characteristic.

A characteristic of this expression is illustrated in FIG. 4.

Once each of these criteria has been given a score, they are combined into a single score between 0 and 10 using, for example, a weighting function. In one embodiment, the criteria are combined into a single score using the following formula:

$$y = \frac{\sum_{i=1}^{n} y_i [2p_i^2 + (y_i - 7)^2]}{\sum_{i=1}^{n} [2p_i^2 + (y_i - 7)^2]}$$

where p represents a rating of the importance for each particular criterion. In one embodiment, p may be selected by the user such that p is between 0 and a value of the same order of magnitude as the constant 7. This is essentially a weighted average; weighted by how important a particular criterion has been marked by the user (p), and by how far the applicant's score for a particular criterion is away from the standard defined by the user. In this way, one item that is way off of the standard can affect the overall score significantly, even if there are other important criteria that meet the standard.

The foregoing description, for purposes of explanation, used specific nomenclature to provide a thorough understanding of the invention. However, it will be apparent to one skilled in the art in light of the description provided that the specific details are not required in order to practice the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

We claim:

1. A method for rapid tenant screening and lease recommendation, and conversion of data to lease documents, said method comprising:
    acquiring tenant information including financial information;
    acquiring property information;
    generating a lease recommendation based on a plurality of acceptance criteria that are based on said tenant information and includes:
        determining a value for each of said plurality of acceptance criteria;
        determining a score for each of said plurality of acceptance criteria based on said value;
        combining said scores into one composite score for a tenant by taking a weighted average of scores for said plurality of acceptance criteria according to the expression:

$$y = \frac{\sum_{i=1}^{n} y_i [2p_i^2 + (y_i - 7)^2]}{\sum_{i=1}^{n} [2p_i^2 + (y_i - 7)^2]}$$

wherein i represents an index of said plurality of acceptance criteria, $p_i$ represents an importance rating for each criteria, $y_i$ represents a score for each acceptance criteria, and y represents said composite score; and
        determining said recommendation based on said composite score; and
    generating lease documents based on said tenant information and said property information.

2. The method of claim 1, wherein said tenant information comprises at least one of: full legal name, social security number, previous address, spouse's full name, dependents, employer name, employer address, and name of all dependents.

3. The method of claim 1, wherein said acquiring of said financial information comprises communicating with a credit reporting agency.

4. The method of claim 3, wherein said financial information comprises a raw credit report from said credit reporting agency.

5. The method of claim 4, wherein said method further comprises parsing said raw credit information into a readable scheme.

6. The method of claim 5, wherein said parsing comprises:
    removing account numbers;
    listing positive and negative ratings, amounts outstanding, and estimates of payments; and
    performing a social security scan for validity.

7. The method of claim 1, wherein said property information comprises a name of a property, a unit number and address, and unit policies.

8. The method of claim 1, wherein determining said recommendation based on said composite score, further comprises:

generating an acceptance recommendation for a tenant having a composite score greater than a predetermined high score;

generating a rejection recommendation for a tenant having a composite score lower than a predetermined low score; and generating a marginally qualified recommendation for a tenant having a composite score between a predetermined low score and a predetermined high score.

9. The method of claim 1, wherein said plurality of acceptance criteria comprise:
   a ratio of monthly gross income to rent;
   a minimum monthly gross income less rent and estimated debt payments;
   maximum percentage of credit accounts with late payments;
   maximum amount of unpaid collections;
   bankruptcy history; and
   previous tenant history.

10. The method of claim 9, wherein determining a score for at least one of said plurality of acceptance criteria comprises scaling said value according to a mathematical function.

11. The method of claim 10, wherein said mathematical function comprises a relationship of the form:

$$y = \left\{k1 + \frac{k2}{[1+b(x-c)^2]}\right\}\left[1 - \frac{k3}{1+e^{a(x-c)}}\right]$$

wherein y represents the score for one of said plurality of acceptance criteria, x is said value for said criterion, c is the standard selected for said criterion, a and b are constants for scaling the value of said criterion to a standard level, k1 is a constant set to the maximum resulting score, k2 is a constant set to control the inflection point of the resulting curve, and k3 is a constant set to control the lowest score.

12. The method of claim 1, wherein said lease documents comprise a lease, disclosures about said property, rules, policies, local ordinances, or other agreements.

13. A system for performing rapid tenant screening and lease recommendation, and conversion of data to lease documents, said method comprising:
   means for acquiring tenant information including financial information;
   means for acquiring property information;
   means for generating a lease recommendation based on a plurality of acceptance criteria that are based on said tenant information and includes:
      determining a value for each of said plurality of acceptance criteria;
      determining a score for each of said plurality of acceptance criteria based on said value;
      combining said scores into one composite score for a tenant by taking a weighted average of scores for said plurality of acceptance criteria according to the expression:

$$y = \frac{\sum_{i=1}^{n} y_i [2p_i^2 + (y_i - 7)^2]}{\sum_{i=1}^{n} [2p_i^2 + (y_i - 7)^2]}$$

wherein i represents an index of said plurality of acceptance criteria, $p_i$ represents an importance rating for each acceptance criteria, $y_i$ represents a score for each acceptance criteria, and y represents said composite score; and
      determining said recommendation based on said composite score; and
   means for generating lease documents based on said tenant information and said property information.

14. The system of claim 13, wherein said means for generating comprises a computer of the type having a processor, a memory coupled to the processor, a computer program including instructions executable in said processor to perform the generation operation.

15. The system of claim 13, wherein said means for acquiring said tenant information further comprises means for communicating with a credit bureau.

16. A computer program product for use in conjunction with a computer system, the computer program product comprising a computer readable storage medium and a computer program mechanism embedded therein, the computer program mechanism comprising:
   a program module that directs a computer processor to function in a specified manner, said manner comprising:
      performing a credit check on an applicant;
      generating a recommendation and report for said applicant including:
         determining a value for each of said plurality of acceptance criteria:
         determining a score for each of said plurality of acceptance criteria based on said value;
         combining said scores into one composite score for a tenant by taking a weighted average of scores for said plurality of acceptance criteria according to the expression:

$$y = \frac{\sum_{i=1}^{n} y_i [2p_i^2 + (y_i - 7)^2]}{\sum_{i=1}^{n} [2p_i^2 + (y_i - 7)^2]}$$

wherein i represents an index of said plurality of acceptance criteria, $p_i$ represents an importance rating for each acceptance criteria, $y_i$ represents a score for each acceptance criteria, and y represents said composite score; and
         determining said recommendation based on said composite score; and
      generating lease documents for said applicant.

17. The computer program product of claim 16 further comprising a capability to set permissions such that a specified user is able to approve said applicant before accessing said generated lease documents.

18. The computer program product of claim 17 further comprising a capability to set permission such that a user may only approve said applicant after the applicant has been recommended by the computer program product.

19. The computer program product of claim 16, wherein determining a score for at least one of said plurality of criteria comprises scaling said value according to a mathematical function.

20. The computer program product of claim 19, wherein said mathematical function comprises a relationship of the form:

$$y = \left\{k1 + \frac{k2}{[1+b(x-c)^2]}\right\}\left[1 - \frac{k3}{1+e^{a(x-c)}}\right]$$

wherein y represents the score for one of said plurality of criteria, x is said value for said criterion, c is the standard selected for said criterion, a and b are constants for scaling the value of said criterion to a standard level, k1 is a constant set to the maximum resulting score, k2 is a constant set to control the inflection point of the resulting curve, and k3 is a constant set to control the lowest score.

21. A method for rapid tenant screening and lease recommendation, and conversion of data to lease documents, said method comprising:
acquiring tenant information including financial information;
acquiring property information;
generating a lease recommendation based on a plurality of acceptance criteria that are based on said tenant information and includes:
determining a value for each of said plurality of acceptance criteria;
determining a score for each of said plurality of acceptance criteria based on said value by scaling said value according to a mathematical function comprising a relationship of the form:

$$y = \left\{k1 + \frac{k2}{[1+b(x-c)^2]}\right\}\left[1 - \frac{k3}{1+e^{a(x-c)}}\right]$$

wherein y represents the score for one of said plurality of acceptance criteria, x is said value for said criterion, c is the standard selected for said criterion, a and b are constants for scaling the value of said criterion to a standard level, k1 is a constant set to the maximum resulting score, k2 is a constant set to control the inflection point of the resulting curve, and k3 is a constant set to control the lowest score;
combining said scores into one composite score for a tenant; and
determining said recommendation based on said composite score; and
generating lease documents based on said tenant information and said property information.

22. The system of claim 13, wherein determining a score for at least one of said plurality of acceptance criteria comprises scaling said value according to a mathematical function.

23. The system of claim 22, wherein said mathematical function comprises a relationship of the form:

$$y = \left\{k1 + \frac{k2}{[1+b(x-c)^2]}\right\}\left[1 - \frac{k3}{1+e^{a(x-c)}}\right]$$

wherein y represents the score for one of said plurality of criteria, x is said value for said criterion, c is the standard selected for said criterion, a and b are constants for scaling the value of said criterion to a standard level, k1 is a constant set to the maximum resulting score, k2 is a constant set to control the inflection point of the resulting curve, and k3 is a constant set to control the lowest score.

24. A method for rapid tenant screening and lease recommendation, and conversion of data to lease documents, said method comprising:
acquiring tenant information that includes financial information for each of two roommates;
acquiring property information;
generating a lease recommendation for the two roommates based on a plurality of acceptance criteria that are based on said tenant information and includes:
determining a value for each of said plurality of acceptance criteria for each roommate;
determining a score for each of said plurality of acceptance criteria based on said value for each roommate;
combining said scores into one composite score for each roommate; and
determining said recommendation for the two roommates based on said composite scores; and
generating lease documents based on said tenant information and said property information.

25. The method of claim 24, wherein determining a value for each of said plurality of acceptance criteria comprises a rent sharing criteria.

26. The method of claim 25, wherein said rent sharing criteria requires that each roommate is responsible for an equal share of the rent plus a predetermined additional percentage of the rent.

27. The method of claim 24, wherein determining said recommendation based on said composite scores for each roommate further comprises combining the composite scores into a single overall score.

28. A method for rapid tenant screening and lease recommendation, and conversion of data to lease documents, said method comprising:
acquiring tenant information including acquiring financial information by communicating with a credit reporting agency, wherein the financial information comprises a raw credit report;
acquiring property information;
generating a lease recommendation based on a plurality of acceptance criteria that are based on said tenant information and includes:
determining a value for each of said plurality of acceptance criteria;
determining a score for each of said plurality of acceptance criteria based on said value;
combining said scores into one composite score for a tenant by taking a weighted average of scores for said plurality of acceptance criteria according to the expression:

$$y = \frac{\sum_{i=1}^{n} y_i [2p_i^2 + (y_i - c)^2]}{\sum_{i=1}^{n} [2p_i^2 + (y_i - c)^2]}$$

wherein i represents an index of said plurality of acceptance criteria, $p_i$ represents an importance rating for each criteria, $y_i$ represents a score for each acceptance criteria, c represents a constant value for a minimum requirement, and y represents said composite score; and
determining said recommendation based on said composite score; and
generating lease documents based on said tenant information and said property information.

* * * * *